United States Patent [19]

Iwata

[11] Patent Number: 5,407,257

[45] Date of Patent: Apr. 18, 1995

[54] TRACTION CONTROL SYSTEM FOR AUTOMOTIVE VEHICLES

[75] Inventor: Toru Iwata, Kanagawa, Japan

[73] Assignee: Nissan Motor Co., Ltd., Yokohama, Japan

[21] Appl. No.: 288,752

[22] Filed: Aug. 11, 1994

Related U.S. Application Data

[63] Continuation of Ser. No. 997,823, Dec. 29, 1992, abandoned.

[30] Foreign Application Priority Data

Jan. 7, 1992 [JP] Japan .................. 4-000613

[51] Int. Cl.$^6$ ............................................. B60T 8/88
[52] U.S. Cl. ............................... 303/92; 303/100; 303/113.2
[58] Field of Search ............. 303/92, 110, 100, 113.2, 303/113.3, 116.2, 114.1, 119.1; 364/426.02, 426.03

[56] References Cited

U.S. PATENT DOCUMENTS

| | | | |
|---|---|---|---|
| 4,209,203 | 6/1980 | Brearley | 303/110 |
| 4,865,397 | 9/1989 | Inoue et al. | 303/113.2 X |
| 4,985,839 | 1/1991 | Dominke | 303/103 X |
| 5,141,296 | 8/1992 | Arikawa | 303/113.2 |
| 5,150,299 | 9/1992 | Fujioka | 303/103 X |

FOREIGN PATENT DOCUMENTS

| | | |
|---|---|---|
| 58-122246 | 7/1983 | Japan . |
| 63-31859 | 2/1988 | Japan . |
| 64-44369 | 2/1989 | Japan . |

Primary Examiner—Robert J. Oberleitner
Assistant Examiner—Lee W. Young
Attorney, Agent, or Firm—Lowe, Price, LeBlanc & Becker

[57] ABSTRACT

An automotive traction control system comprises a master cylinder, an external brake fluid pressure source, a brake fluid pressure control actuator being applied commonly to an acceleration-slip control and a deceleration-slip control, a first switching valve for establishing and blocking a communication between the master cylinder and the pressure control actuator, a second switching valve for establishing and blocking a communication between the external brake fluid pressure source and the pressure control actuator, and a control unit for deriving a pressure reducing control time necessary to reduce the wheel cylinder pressure to a designated brake fluid pressure, based on a pressure intensifying control time, during the acceleration-slip control. The control unit is arranged for switching the second switching valve just after the pressure reducing control time has elapsed, and for switching the first switching valve and a pressure intensifying valve and a pressure reducing valve both included in the pressure control actuator with a predetermined time lag after shifting of the second switching valve, in a transient state transiting from the acceleration-slip control mode to the normal braking operational mode.

5 Claims, 7 Drawing Sheets

TRACTION CONTROL SYSTEM FOR AUTOMOTIVE VEHICLES

This application is a continuation of application Ser. No. 07/997,823 filed Dec. 29, 1992, now abandoned.

BACKGROUND OF THE INVENTION

1. Field of the Invention

The present invention relates to an automotive traction control system which is applied for suppressing excessive driving force exerted on at least one of driven wheels during quick depressing operation of the accelerator pedal, such as quick starting, quick acceleration, or the like, and specifically to an automotive traction control system employing a brake fluid pressure actuator applied commonly to a traction control executed during acceleration-slip and an anti-skid brake control executed during deceleration-slip.

2. Description of the Prior Disclosure

Recently, there have been proposed and developed various automotive traction control systems, namely a traction control system generally abbreviated as a "TCS" which is provided for suppressing excessive driving force exerted on driven wheels during acceleration-slip, an anti-skid brake control system generally abbreviated as an "ABS" which is provided for preventing brakes from locking road wheels during deceleration-slip, such as quick braking or braking on a low frictional road surface so as to provide maximum effective braking, and a servo-assisted brake control device which is provided for generating a wheel-cylinder pressure higher than a master-cylinder pressure at a relatively light brake pedal pressure. In such a conventional brake control system employing both the TCS and the ABS, a brake fluid pressure control actuator is usually arranged upstream of the wheel-cylinders to be applied commonly to the acceleration-slip control and the deceleration-slip control. One such traction control system employing the brake fluid pressure actuator applied commonly to the acceleration-slip control and the deceleration-slip control has been disclosed in Japanese First Publication Tokkai (Showa) 58-122246.

The above-mentioned conventional traction control system has a pair of switching valves, namely a first switching valve being arranged between a master cylinder and a brake fluid pressure actuator for establishing and blocking a fluid communication between the master cylinder and the brake fluid pressure actuator, and a second switching valve being arranged between the brake fluid pressure actuator and an external brake fluid pressure source provided for generating a brake fluid pressure irrespective of depression of the brake pedal for establishing and blocking a fluid communication between the external brake fluid pressure source and the brake fluid pressure actuator. Furthermore, the brake fluid pressure actuator is traditionally comprised of a plurality of pairs of fluid pressure intensifying valve and fluid pressure reducing valve, each pair being associated with either one of the wheel cylinders. In case that the acceleration-slip control terminates and a normal braking operation recovers, the first switching valve is switched from the valve closed state to the valve open state so as to establish the communication between the outlet port of the master cylinder and the inlet port of the brake fluid pressure actuator, upon termination of the acceleration-slip control, while the second switching valve is switched from the valve open state to the valve closed state so as to block the communication between the outlet port of the external brake fluid pressure source and the inlet port of the brake fluid pressure actuator. The pressure intensifying valve and the pressure reducing valve included in the brake fluid pressure actuator are both shifted from an acceleration-slip controlling state to a normal state, for permitting the master-cylinder pressure to be introduced into each wheel cylinder during the normal braking operation. Such a series of returning operations of the valves could be performed at a simultaneous timing. Therefore, the conventional traction control system has some drawbacks as hereinafter described in detail.

Assuming that switching of the second switching valve delays when compared with switching of the first switching valve, both of the switching valves are opened momentarily. In this case, there is a tendency the brake fluid pressure generated from the external brake fluid pressure source to be introduced through the second switching valve and the first switching valve to the master cylinder, in that order. There is a possibility that the master cylinder is damaged due to the pressurized brake fluid pressure created by the external brake fluid pressure source.

Assuming that the second switching valve is switched at an earlier timing than the first switching valve, both of the valves are closed momentarily. In this case, the fluid pressure stored in the brake fluid pressure actuator escapes into the wheel cylinders, thereby resulting in an increase in the wheel-cylinder pressure. As a result, there is a possibility that the driver feels uncomfortable due to undesired deceleration.

Assuming that the normal braking operation recovers just after a pressure intensifying mode of the acceleration-slip brake control according to which a high brake fluid pressure is introduced into the wheel cylinder and thereafter the control operation is shifted to the deceleration-slip control or the acceleration-slip control, there is a tendency the brake fluid to be returned from the brake fluid pressure actuator to a brake fluid reservoir to exceed a volumetric capacity of the reservoir at a pressure reducing mode of the acceleration-slip control or the deceleration-slip control. In this case, it is difficult to suitably set the pressure reducing control time. In addition, a durability of the valve may be lowered due to the remaining pressurized brake fluid having a relatively high pressure.

Assuming that the normal braking operation recovers when a predetermined period of time has elapsed after termination of the acceleration-slip brake control, a control response may be delayed by the predetermined period of time, when a stop instruction for an acceleration requirement is generated, a malfunction of the traction control system is detected, or a deceleration-slip control is required, during the acceleration-slip control. This results in an increase in braking distance during the deceleration-slip control. In other words, braking time is retarded.

SUMMARY OF THE INVENTION

It is, therefore, in view of the above disadvantages, an object of the invention to provide an automotive traction control system employing a brake fluid pressure control actuator applied commonly to both a TCS corresponding to an acceleration-slip control system and an ABS corresponding to a deceleration-slip control system, which can reliably prevent a master cylinder or a wheel cylinder from being affected due to an undesirable brake fluid pressure when a normal braking operation recovers after the acceleration-slip control.

It is another object of the invention to provide an automotive traction control system employing a brake fluid pressure control actuator applied commonly to the TCS and the ABS, in which a pressure reducing control can be assuringly achieved subsequently to the acceleration-slip control even when the normal braking operation recovers under a particular condition wherein the traction control system operates at a pressure intensifying mode during the acceleration-slip control.

It is a further object of the invention to provide an automotive traction control system which can provide a high step-response even when a stop instruction for an acceleration requirement is generated, a malfunction of the traction control system is detected, or a deceleration-slip control requirement is generated, during the acceleration-slip control.

It is a still further object of the invention to provide an automotive traction control system employing a brake fluid pressure actuator applied commonly to the TCS and the ABS and employing a plurality of pairs of pressure intensifying valve and pressure reducing valve, each pair being associated with either one of wheel cylinders, which can provide a high durability of the respective valve.

In order to accomplish the aforementioned and other objects, an automotive traction control system comprises a master cylinder for generating a master cylinder pressure based on a movement of a brake pedal, an external brake fluid pressure source for generating a brake fluid pressure, regardless of depression of the brake pedal, a brake fluid pressure control actuator being applied commonly to an acceleration-slip control and a deceleration-slip control, for controlling a wheel cylinder pressure in each wheel cylinder pressure in each wheel cylinder, a first switching valve for establishing and blocking a fluid communication between the master cylinder and the pressure control actuator, a second switching valve for establishing and blocking a fluid communication between the external brake fluid pressure source and the pressure control actuator, means for deriving a pressure reducing control time necessary to reduce the wheel cylinder pressure to a designated brake fluid pressure, based on a pressure intensifying control time when the pressure control actuator operates at a pressure intensifying mode, during the acceleration-slip control according to which the first switching valve is shifted to a valve closed state to block the communication between the master cylinder and the pressure control actuator and the second switching valve is shifted to a valve open state to establish the communication between 10 the external brake fluid pressure source and the pressure control actuator, and a first normal braking operation recovery control means for shifting the second switching valve to a valve closed state just after the pressure reducing control time has elapsed, and for shifting the first switching valve to a valve open state with a predetermined time lag after shifting of the second switching valve, and for recovering the pressure control actuator to a normal braking operational mode, in a transient state wherein a brake control mode is shifted from the acceleration-slip control mode to the normal braking operational mode at which the wheel cylinder pressure is adjusted depending on the magnitude of the master-cylinder pressure. The brake fluid pressure control actuator may include a plurality of pairs of pressure intensifying valve and pressure reducing valve, each pair being associated with either one of the wheel cylinders. The pair of pressure intensifying valve and pressure reducing valve is cooperative with each other during the acceleration-slip control in a manner so as to operate at three modes among the pressure intensifying mode wherein the wheel cylinder pressure in the associated wheel cylinder is intensified by the brake fluid pressure introduced thereinto through the external brake fluid pressure source for the pressure intensifying control time, a pressure holding mode wherein the wheel cylinder pressure is held unchanged, and the pressure reducing mode wherein the wheel cylinder pressure is reduced for the pressure reducing control time. The predetermined time lag is preferably set at approximately 30 msec.

According to another aspect of the invention, an automotive traction control system comprises a master cylinder for generating a master cylinder pressure based on a movement of a brake pedal, an external brake fluid pressure source for generating a brake fluid pressure, regardless of depression of the brake pedal, a brake fluid pressure control actuator being applied commonly to an acceleration-slip control and a deceleration-slip control, for controlling a wheel cylinder pressure in each wheel cylinder, a first switching valve for establishing and blocking a fluid communication between the master cylinder and the pressure control actuator, a second switching valve for establishing and blocking a fluid communication between the external brake fluid pressure source and the pressure control actuator, means for monitoring occurrence of a stop instruction for an acceleration requirement, a malfunction of the system, or a deceleration-slip requirement according to which an anti-skid brake control starts, in a transient state wherein a normal braking operation recovers after termination of the acceleration-slip control according to which the first switching valve is shifted to a valve closed state to block the communication between the master cylinder and the pressure control actuator and the second switching valve is shifted to a valve open state to establish the communication between the external brake fluid pressure source and the pressure control actuator, and a second normal braking operation recovery control means for shifting the second switching valve to a valve closed state just after the occurrence of the stop instruction for an acceleration requirement, the malfunction of the system, or the deceleration-slip requirement, and for shifting the first switching valve to a valve open state with a predetermined time lag after shifting of the second switching valve, and for recovering the pressure control actuator to a normal braking operational mode, in the transient state.

According to a further aspect of the invention, an automotive traction control system comprises a master cylinder for generating a master cylinder pressure based on a movement of a brake pedal, an external brake fluid pressure source for generating a brake fluid pressure, regardless of depression of the brake pedal, a brake fluid pressure control actuator being applied commonly to an acceleration-slip control and a deceleration-slip control, for controlling a wheel cylinder pressure in each wheel cylinder, a first switching valve for establishing and blocking a fluid communication between the master cylinder and the pressure control actuator, a second switching valve for establishing and blocking a fluid communication between the external brake fluid pressure source and the pressure control actuator, means for deriving a pressure reducing control time necessary to reduce the wheel cylinder pressure to a designated brake fluid pressure, based on a pressure intensifying control time when the pressure control actuator operates at a pressure intensifying mode, during the acceleration-slip control according to which the first switching valve is shifted to a valve closed state to block the communication between the master cylinder and the pressure control actuator and the second switching valve is shifted to a valve open state to establish the communication between the external brake fluid pressure source and the pressure control actuator, a first normal braking operation recovery control means for shifting the second switching valve to a valve closed state just after the pressure reducing control time has elapsed, and for shifting the first switching valve to a valve open state with a predetermined time lag after shifting of the second switching valve, and for recovering the pressure control actuator to a normal braking operational mode, in a transient state wherein a brake control mode is shifted from the acceleration-slip control mode to the normal braking operational mode at which the wheel cylinder pressure is adjusted depending on the magnitude of the master-cylinder pressure, means for monitoring occurrence of a stop instruction for an acceleration requirement, a malfunction of the system, or a deceleration-slip requirement according to which an anti-skid brake control starts, in the transient state, and a second normal braking operation recovery control means for shifting the second switching valve to the valve closed state just after the occurrence of the stop instruction for an acceleration requirement, the malfunction of the system, or the deceleration-slip requirement, and for shifting the first switching valve to the valve open state with a predetermined time lag after shifting of the second switching valve, and for recovering the pressure control actuator to the normal braking operational mode, in the transient state. A command generated by the second normal braking operation recovery control means gets priority over a command generated by the first normal braking operation recovery control means.

DESCRIPTION OF THE PREFERRED EMBODIMENTS

Figure 1:
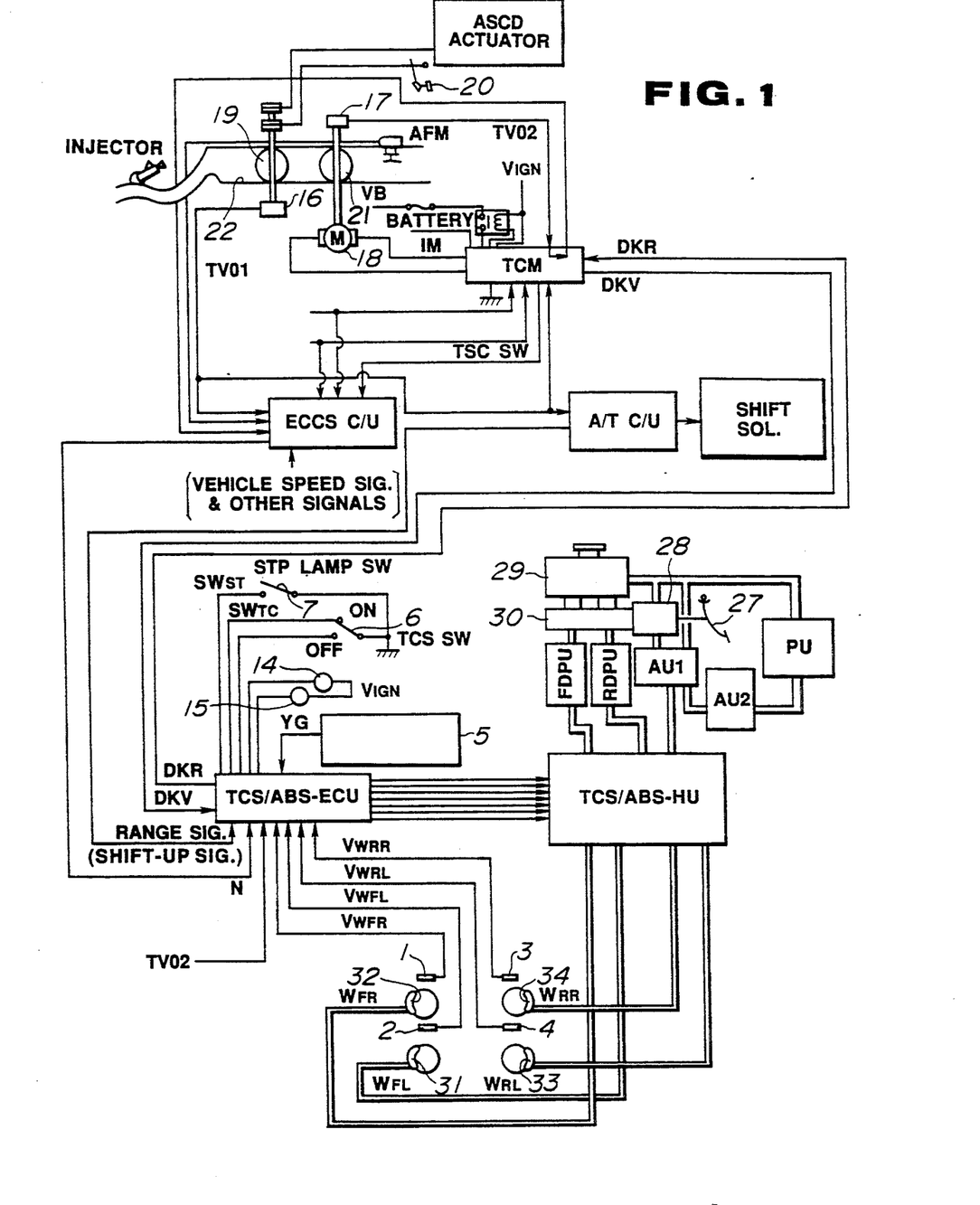
FIG. 1 is a system diagram illustrating a preferred embodiment of a control system for braking and driving systems for a rear-wheel drive vehicle which employs a traction control system according to the invention.

Referring now to the drawings, particularly to FIG. 1, there is shown a total control system for braking and driving systems for a rear-wheel drive vehicle. The total control system includes a traction control system which is hereinafter referred to as a "TCS" and provided for suppressing excessive driving force exerted on at least one of rear driven wheels during acceleration-slip, and an anti-skid brake control system which is hereinafter referred to as an "ABS" and provided for preventing wheel-lock during deceleration slip, so as to provide maximum effective braking. The TCS is generally comprised of a throttle control system which can perform a throttle valve opening angle control so as to maintain the slip ratio of each rear driven wheel within a predetermined criterion during the acceleration-slip, and an acceleration slip brake control system which can perform a brake control for independently controlling braking forces applied to rear-left and rear-right driven wheels depending on the respective slip ratios during acceleration slip. The centralized control for the TCS and ABS is performed by means of an electronic control unit applied commonly to both the TCS and ABS. The electronic control unit will be hereinafter abbreviated as a "TCS/ABS-ECU".

The TCS/ABS-ECU receives various signals, namely four wheel speed signals $V_{WFR}$, $V_{WFL}$, $V_{WRR}$, $V_{WRL}$, respectively generated from a front-right wheel speed sensor 1, a front-left wheel speed sensor 2, a rear-right wheel speed sensor 3, and a rear-left wheel speed sensor 4, and a lateral acceleration indicative signal YG generated from a lateral acceleration sensor 5, a switch signal $SW_{TC}$ generated from a TCS switch 6, a switch signal $SW_{ST}$ generated from a brake lamp switch 7, an actual throttle opening angle signal DKV generated by a throttle control module hereinafter abbreviated as a "TCM" and representative of an actual throttle opening angle of a first throttle valve 19, a range signal and a shift-up signal generated from an automatic transmission control unit hereinafter abbreviated as an "A/T C/U", an engine speed signal N generated from an electronic engine centralized control unit hereinafter abbreviated as an "ECCS C/U", and a second throttle valve opening angle signal TVO2 generated from a second throttle opening angle sensor 17. The TCS/ABS-ECU makes a judgement based on the received signals which one of an acceleration-slip state, a deceleration-slip state, and a non-slip state the vehicle is conditioned in. When the TCS/ABS-ECU determines that the vehicle is in the acceleration-slip state, the TCS/ABS-ECU outputs target throttle opening angle signal DKR indicative of a target throttle opening angle for a second throttle valve 21 to the TCM, in order to approach the second throttle opening angle TV02 to the target throttle opening angle signal value DKR. During acceleration slip, the TCS/ABS-ECU also outputs a solenoid activating and deactivating signal to respective solenoids employed in a brake fluid pressure controlling hydraulic unit applied commonly to the TCS and the ABS. The hydraulic unit will be hereinafter abbreviated as a "TCS/ABS-HU". Of these traction controls performed during acceleration slip, the former traction control executed by adjusting a throttle valve opening angle will be referred to as a "TCS throttle control", while the latter traction control executed by controlling the magnitude of brake fluid pressure applied to each driven-wheel cylinder will be hereinafter referred to as a "TCS brake control".

On the other hand, when the TCS/ABS-ECU determines that the vehicle is in the deceleration slip state, the TCS/ABS-ECU outputs a solenoid activating and deactivating signal to each solenoid valve employed in the TCS/ABS-HU so as to achieve a suitable anti-skid brake control. The anti-skid brake control will be hereinafter referred to as an "ABS brake control". In addition to the above, the centralized control unit TCS/ABS-ECU outputs a lighting command to a TCS failure warning lamp 14 provided for warning the failure in the TCS, and also outputs a lighting command to a TCS operating lamp 15 provided for indicating the operative state of the TCS.

The throttle control module TCM is comprised of a throttle opening angle control circuit mainly employing a throttle motor driving circuit. The TCM receives a first throttle opening angle signal TVO1 generated from a first throttle opening angle sensor 16. As previously described, the TCM outputs the actual throttle opening angle signal DKV indicative of the actual throttle opening angle of the first throttle valve 19 to the TCS/ABS-ECU. The TCM also receives the second throttle opening angle signal TVO2 as a feedback information necessary to derive the target throttle opening angle signal value DKR indicative of the target throttle opening angle of the second throttle valve 21 and generates a motor driving current IM to the throttle motor 18 based on the target throttle opening angle signal DKR, so as to approach the second throttle opening angle to the target throttle opening angle signal value. In FIG. 1, $V_{IGN}$ designates an ignition voltage, while $V_B$ designates a battery voltage.

The first throttle valve 19 whose opening angle is detected by the first throttle opening angle sensor 16 is operated sequentially to the depressing movement of an accelerator pedal 20, while the second throttle valve 21 associated with the second throttle opening angle sensor 17 is arranged in series to the first throttle valve 19 in an air intake pipe 22. The opening angle of the second throttle valve is adjusted by means of the throttle motor 18.

The TCS is associated with an electronic engine centralized control system serving as one peripheral system of the TCS. The electronic engine centralized control system includes an air flow meter AFM, the electronic engine centralized control unit ECCS C/U and fuel injectors to achieve a fuel injection control, an ignition timing control, and an idling speed compensation, for example. When the engine centralized control system receives the switch ON signal $SW_{TC}$ indicative of an ON state of the TCS switch 6, the engine centralized control system generally selects a lower one of the first and second throttle opening angles TVO1 and TVO2, in order to achieve a transient traction control. Such a selection control is generally referred to as a "low-select control for a throttle opening angle". Upon starting of the low-select control, the engine centralized control system operates to terminate both a canister control and an exhaust gas recirculation (EGR) control.

The TCS is associated with an automatic serving transmission control system as the other peripheral system of the TCS. The automatic transmission control system includes the automatic transmission control unit A/T C/U and shift solenoids connected to the A/T C/U to achieve a gear shift control, such as a shift-up operation, a shift-down operation, and a lock-up control in the case of a lock-up torque converter employing a lock-up mechanism which is operable for directly and mechanically interconnecting a turbine runner and a converter cover to transmit torque from an engine crankshaft directly to the turbine runner during vehicle running at a relatively high speed greater than a predetermined vehicle speed. The automatic transmission control unit A/T C/U is connected to the centralized control unit TCS/ABS-ECU to output the shift-up signal and the range signal thereinto.

The TCS is also associated with an automatic speed control system serving as the other peripheral system of the TCS. The automatic speed control system is generally abbreviated as an "ASCD" and employs an ASCD actuator to achieve an auto-cruise control according to which the vehicle speed is automatically held at a desired constant speed. When the ASCD receives the switch ON signal of the TCS switch, the ASCD terminates a throttle valve opening angle increasing control according to which the opening angle of the first throttle valve 19 is increased. In contrast to the above, upon receiving the switch OFF signal of the TCS switch, the ASCD controls the opening angle of the first throttle valve 19 in such a manner as to moderately return it in a direction increasing the opening angle.

Figure 2:
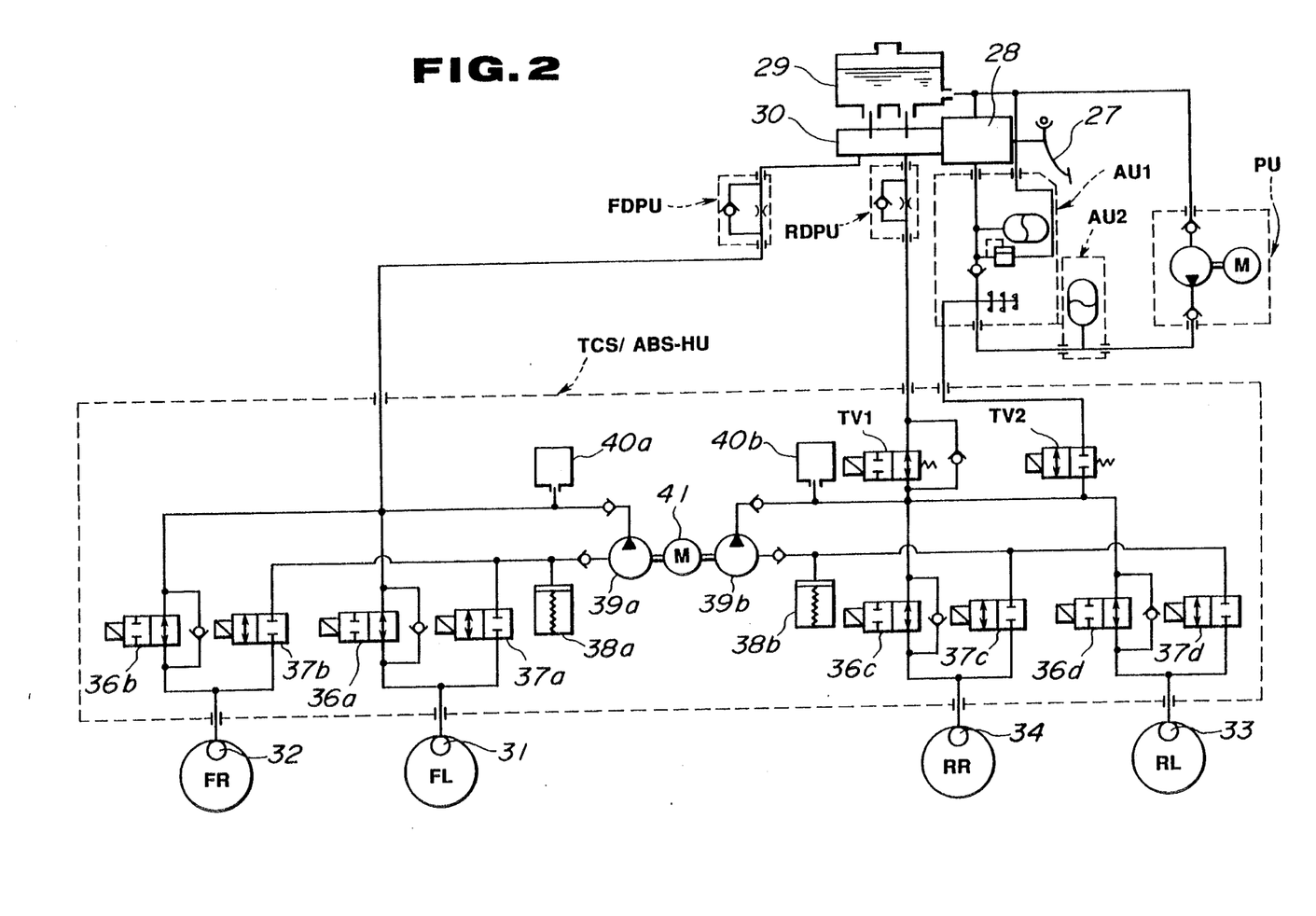
FIG. 2 is a hydraulic circuit diagram illustrating a brake fluid pressure control system of the preferred embodiment applied commonly to a TCS brake control for driven wheels and an ABS brake control for four road wheels.

Referring now to FIG. 2, there is shown a brake fluid pressure controlling hydraulic system mainly employing the TCS/ABS-HU applied commonly to the TCS according to which the increase or decrease in the wheel-cylinder pressure can be independently carried out in the rear-right and rear-left driven wheels during acceleration slip and to the ABS according to which the increasing, decreasing or holding in the wheel-cylinder pressure can be independently carried out in front-right, front-left, rear-right and rear-left wheels during deceleration slip, such as during quick braking or braking on a low frictional road surface. In addition to the TCS/ABS-HU, the brake fluid pressure control system comprises a brake pedal 27, a master cylinder 30 generating a master-cylinder pressure based on the magnitude of depressing force applied onto the brake pedal 27, a brake fluid reservoir 29 attached to the master cylinder 30, a hydraulic booster 28 provided to apply an intensifying force greater than an actual brake-pedal depressing force to a piston slidably enclosed in the master cylinder 30, front-left, front-right, rear-left and rear-right wheel cylinders 31, 32, 33, and 34, a hydraulic pump unit PU, a first pressure accumulator unit AU1, a second pressure accumulator unit AU2, a front-wheel side of damping unit FDPU provided for controlling the flow rate of brake fluid fed from the master cylinder 30 to the front wheel-cylinders 31 and 32, and a rear-wheel side of damping unit RDPU provided for controlling the flow rate of brake fluid fed from the master cylinder to the rear wheel-cylinders 33 and 34. The hydraulic pump unit PU, the first and second pressure accumulator units AU1 and AU2 serve as an external brake fluid pressure source. Each damping unit FDPU and RDPU is in general comprised of a check valve and an orifice being arranged in parallel with each other.

As shown in FIG. 2, the hydraulic unit TCS/ABS-HU comprises a first directional control valve TV1 connected via the damping unit RDPU to the outlet port of the tandem master cylinder associated with the rear driven wheel cylinders, and a second directional control valve TV2 connected to the outlet port of the external brake fluid pressure source. As clearly seen in FIG. 2, the first directional control valve TV1 is comprised of a normally open type of electromagnetic two-position solenoid valve, while the second directional control valve TV2 is comprised of a normally closed type of electromagnetic two-position solenoid valve. The TCS/ABS-HU also comprises a front-left wheel cylinder pressure intensifying valve 36a, a front-right wheel cylinder pressure intensifying valve 36b, a rear-left wheel cylinder pressure intensifying valve 36c, and a rear-right wheel cylinder pressure intensifying valve 36d, a front-left wheel cylinder pressure reducing valve 37a, a front-right wheel cylinder pressure reducing valve 37b, a rear-left wheel cylinder pressure reducing valve 37c, a rear-right wheel cylinder pressure reducing valve 37d, a front-wheel side brake fluid reservoir 38a, a rear-wheel side brake fluid reservoir 38b, a front-wheel side pumping unit 39a, a rear-wheel side pumping unit 39b, a front-wheel side of brake fluid pressure damping chamber 40a, a rear-wheel side of brake fluid pressure damping chamber 40b, and a pump motor 41 having a driving connection with the respective pumping units 39a and 39b. In the preferred embodiment, each wheel cylinder pressure intensifying valve 36a, 36b, 36c, and 36d is comprised of a normally open type of electromagnetic two-position solenoid valve, while each wheel cylinder pressure reducing valve 37a, 37b, 37c, and 37d is comprised of a normally closed type of electromagnetic two-position solenoid valve.

With the above arrangement of the brake fluid pressure controlling hydraulic system, the first and second directional control valves TV1 and TV2 are both maintained in an OFF position during the normal braking operation or the ABS brake control so as to introduce the master cylinder pressure into the rear driven wheel cylinders, while both control valves TV1 and TV2 are kept in an ON position during the TCS brake control so as to introduce a brake fluid pressure generated from the second accumulator unit AU2 included in the external brake fluid pressure source. Assuming that the hydraulic unit TCS/ABS-HU is operated in a pressure intensifying mode during the TCS brake control, the rear-wheel side of pressure intensifying valves 36c and 36d and the rear-wheel side of pressure reducing valves 37c and 37d are all kept in the OFF positions as shown in FIG. 2. In a pressure holding mode during the TCS brake control, the rear-wheel side of pressure intensifying valves 36c and 36d are kept in the ON positions, while the rear-wheel side of pressure reducing valves 37c and 37d are kept in the OFF positions. In a pressure reducing mode during the TCS brake control, the rear-wheel side of pressure intensifying valves 36c and 36d and the rear-wheel side of pressure reducing valves 37c and 37d are all kept in the ON positions. During the above-mentioned pressure reducing mode, brake fluids in the driven wheel cylinders 33 and 34 are temporarily stored in the reservoir 38b via the respective pressure reducing valves 37c and 37d, and thereafter fed through the pumping unit 39b to the damping chamber 40b.

The previously noted first accumulator unit AU1 serves as a hydraulic pressure source for the hydraulic booster 28, while the second accumulator unit AU2 serves as a hydraulic pressure source for the TCS brake control. Both accumulator units AU1 and AU2 are arranged in series to each other in respect to the hydraulic pump unit PU connected to the brake fluid reservoir 29, and a fluid pressure in the pressure accumulator employed in each accumulator unit AU1 and AU2 is held at a predetermined accumulator pressure by way of pressurized brake fluid properly generated from the pump unit PU. The pair of damping units FDPU and RDPU are provided to prevent pressure fluctuations in the hydraulic unit TCS/ABS-HU from affecting the master cylinder pressure and to enhance feeling of depression of the brake pedal.

Figure 3:
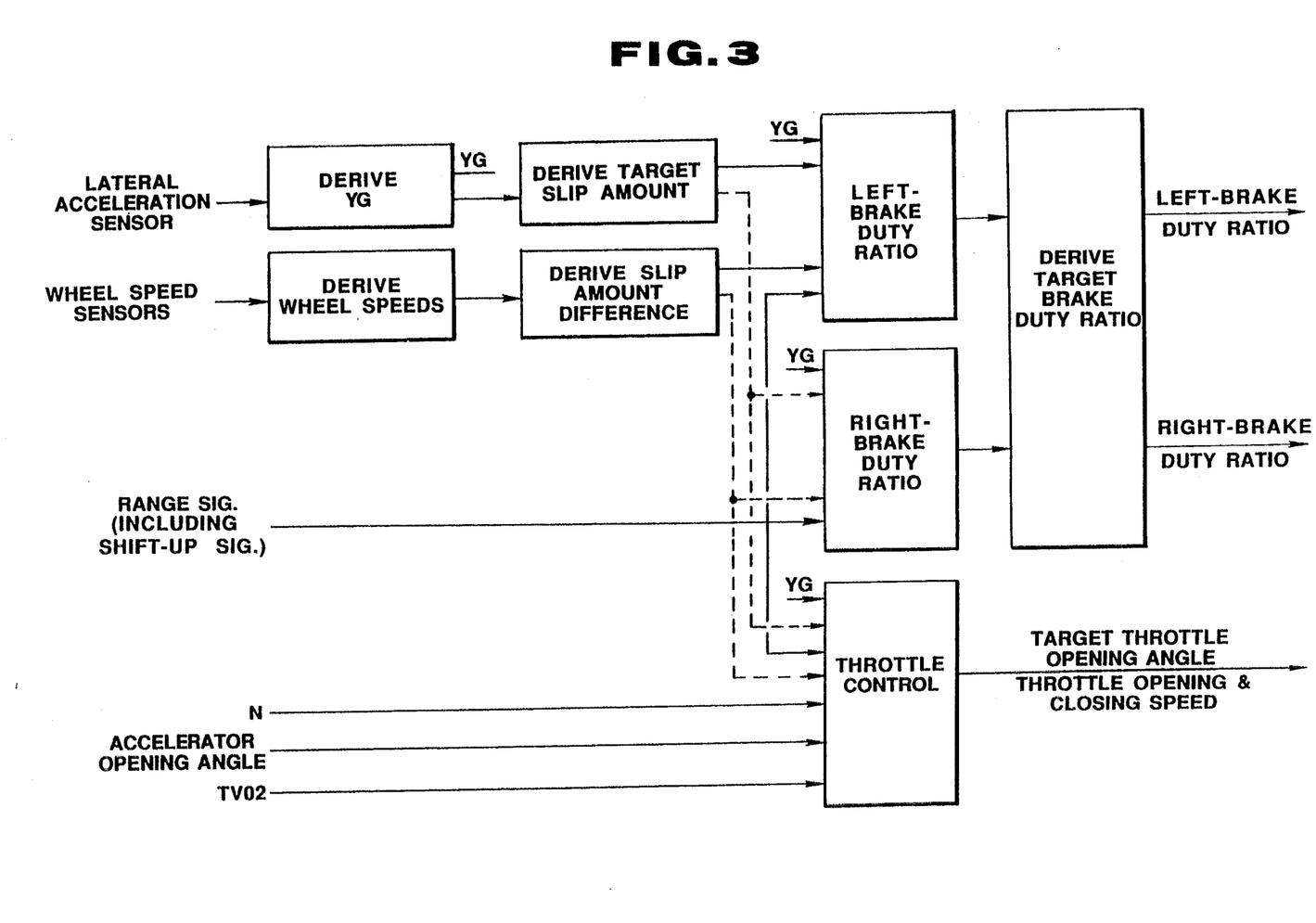
FIG. 3 is a schematic block diagram illustrating a traction control logic executed by the traction control system of the present embodiment.

The traction control logic executed by the TCS/ABS-ECU is hereinbelow described in detail in accordance with a logic diagram shown in FIG. 3. The traction control logic is classified broadly into the following four operations.

A first operation is executed to derive an actual slip amount and an actual slip amount difference between the right and left driven wheels, based on the wheel speed indicative signal values $V_{WFR}$, $V_{WFL}$, $V_{WRR}$, and $V_{WRL}$ monitored by the wheel speed sensors 1, 2, 3 and 4. In the embodiment, the actual monitored wheel speed signals are introduced through filtering circuits into the TCS/ABS-ECU to filter-out undesirable noise from the monitored wheel speed signals. Actually, the first operation is executed on the basis of the filtered wheel speed signals. Based on the slip amount and the slip amount difference, the TCS/ABS-ECU makes a judgement whether the vehicle is in an acceleration slip state.

A second operation is executed to derive a target slip amount and a target slip amount difference between the driven wheels, based on the lateral acceleration signal YG filtered from the output signal of the sensor 5 and a vehicle speed monitored by a conventional vehicle speed sensor or derived from the four wheel speed signal values. The TCS/ABS-ECU judges a vehicle running state such as a straight-ahead running or cornering on the basis of the lateral acceleration signal value, and thus derives the target slip amount and the target slip amount difference suitable for the current vehicle running state and the vehicle speed.

A third operation is executed to derive duty ratios necessary for the rear-left and rear-right wheel brakes, such as a rear-left wheel cylinder pressure intensifying and reducing speed and a rear-right wheel cylinder pressure intensifying and reducing speed, by comparing the actual slipping state obtained through the above first operation with the target slipping state obtained through the above second operation, and outputs the duty ratio indicative signals for the rear-right and rear-left brakes to the hydraulic unit TCS/ABS-HU. According to the third operation, the target duty ratios for rear brakes are calculated to achieve an optimal yawing moment control and thus the rear-right brake fluid pressure and the rear-left brake fluid pressure are controlled independently of each other in accordance with the two duty ratios calculated by the TCS/ABS-ECU.

A fourth operation is executed to derive a target throttle opening angle of the second throttle valve 21 and an opening and closing speed of the second throttle valve 21 by comparing the actual slipping state obtained through the above first operation with the target slipping state obtained through the above second operation, and generates the target throttle opening angle indicative signal DKR and the throttle opening and closing speed indicative signal to the throttle control module TCM.

According to the previously noted traction control logic, the TCS/ABS-ECU determines an acceptable slipping state and a share between the TCS brake control and the TCS throttle control both contributory to the traction control, based on the magnitude of the lateral acceleration YG. Therefore, it is advantageous to actively enhance safety of the vehicle, while insuring a predictability of critical state of the vehicle, which is recognizable by steering effort, squeal noise or the like, depending upon the road surface condition such as wet, icy or snow roads or dry pavement, and upon a design of the automobile chassis. The TCS/ABS-ECU is associated with the automatic transmission control unit A/T C/U to enhance a controllability of the vehicle in each range and to assure a high drivability during shifting gears in the automatic transmission, through a proper throttle/brake control depending on the range position, and a transient shifting state, such as shiftup and shiftdown. The TCS/ABS-ECU is associated with the electronic engine centralized control unit ECCS C/U so as to achieve a smooth acceleration feeling and a high controllability while suppressing hunting phenomena due to slipping and to achieve a high responsibility of an engine torque increasing and decreasing control, through a proper throttle control based on the engine speed N.

The operation of the ABS brake control is hereinafter described briefly.

When the slip amount of at least one of road wheels exceeds a predetermined threshold during deceleration slip, occurring due to quick braking, for example, the TCS/ABS-ECU outputs control signals to each solenoid valve of the TCS/ABS-HU in order to increase, hold or decrease the respective wheel cylinder pressures independently of each other. According to the ABS brake control, it is advantageous to reliably prevent excessive braking forces from locking vehicle wheels during quick braking or during braking on a low frictional road surface. The ABS brake control assures a relatively short braking distance and a braking stability.

The operation of the normal braking operation recovery control according to which the normal braking operation recovers after termination of the acceleration-slip control, is hereinbelow described in detail in accordance with the flow chart of FIG. 4.

In step 50, a test is made to determine whether the vehicle is conditioned in the acceleration-slip state, on the basis of calculated results of the actual slip amount and the slip difference derived by the first operation of the above-noted logic diagram. If the answer to step 50 is affirmative (YES), step 51 proceeds.

In step 51, the centralized control unit TCS/ABS-ECU determines a predetermined period of time $t_2$ when the TCS operates at a pressure reducing mode, on the basis of a predetermined period of time $t_1$ when the TCS operates at a pressure intensifying mode. The time $t_1$ corresponds to a time necessary to intensify the wheel cylinder pressure to a first designated brake fluid pressure based on the current acceleration-slip state, while the time $t_2$ corresponds to a time necessary to reduce the wheel cylinder pressure to a second designated brake fluid pressure based on the current acceleration-slip state. The former period of time $t_1$ will be hereinafter referred to as a "pressure intensifying control time", while the latter period of time $t_2$ will be hereinafter referred to as a "pressure reducing control time". The pressure reducing control time $t_2$ is derived as $(K \times t_1)$, by multiplying the pressure intensifying control time $t_1$ by a predetermined gain K, such as 1 through 2. Thereafter, the control procedure advances to step 52.

In step 52, a test is made to determine whether the predetermined pressure reducing control time $t_2$ has completely elapsed. If the answer to step 52 is negative (NO), step 53 proceeds in which the hydraulic 10 unit TCS/ABS-HU is maintained at either one of three modes, namely a pressure intensifying mode wherein the wheel cylinder pressure is intensified by the pressurized brake fluid pressure supplied from the external brake fluid pressure source through the pressure intensifying valve, a pressure holding mode wherein the wheel cylinder pressure is held unchanged, and a pressure reducing mode wherein the wheel cylinder pressure is released and reduced by means of the pressure reducing valve, based on the current acceleration-slip state.

On the other hand, if the answer to step 52 is affirmative, step 54 proceeds. In step 54, the second switching valve TV2 is shifted from the ON position (valve open state) to the OFF position (valve closed state), and thereafter the first switching valve TV1 is shifted from the ON position (valve closed state) to the OFF position (valve open state) just after predetermined time lag 30 msec has elapsed after termination of shifting operation of the second switching valve TV2. Note that the shifting timing of the second switching valve corresponds to a particular time point at which the pressure reducing control time $t_2$ has elapsed. In other words, the shifting timing the second switching valve TV2 is set at the particular timing point at which the TCS control being in the pressure reducing mode terminates.

In addition to the above shifting operations, the pressure intensifying valves 36c and 36d and the pressure reducing valves 37c and 37d are all shifted from the ON positions to the OFF positions with the predetermined time lag of 30 msec after termination of shifting operation of the second switching valve. That is, the respective pressure intensifying valves 36c and 36d are both shifted to the valve open states, while the respective pressure reducing valves 37c and 37d are both shifted to the valve closed states. With this arrangement, the master-cylinder pressure can be introduced through the first switching valve TV1, and the respective pressure intensifying valves 36c and 36d, to the rear-right and rear-left driven wheel cylinders 34 and 33. In this manner, the normal braking operation recovers after termination of the acceleration slip control.

Returning to step 50, when the vehicle is conditioned in an uncontrolled state being out of the TCS brake control, i.e., the answer to step 50 is negative, step 55 proceeds in which the first and second switching valves TV1 and TV2 are both maintained in OFF positions, while the pressure intensifying valves 36c and 36d and the pressure reducing valves 37c and 37d are all maintained in OFF positions. As appreciated from the above, the braking system is operated in accordance with the normal braking operation, in the uncontrolled state.

The above mentioned normal braking operation recovery control procedure is performed under a particular condition wherein the control unit does not receive a stop instruction for an acceleration requirement, an abnormal signal indicative of a malfunction of the traction control system, or a deceleration-slip control requirement (an ABS brake control requirement). During the previously noted normal braking operation recovery control, the TCS brake control system operates in accordance with the timing charts shown in FIG. 5.

Figure 5:
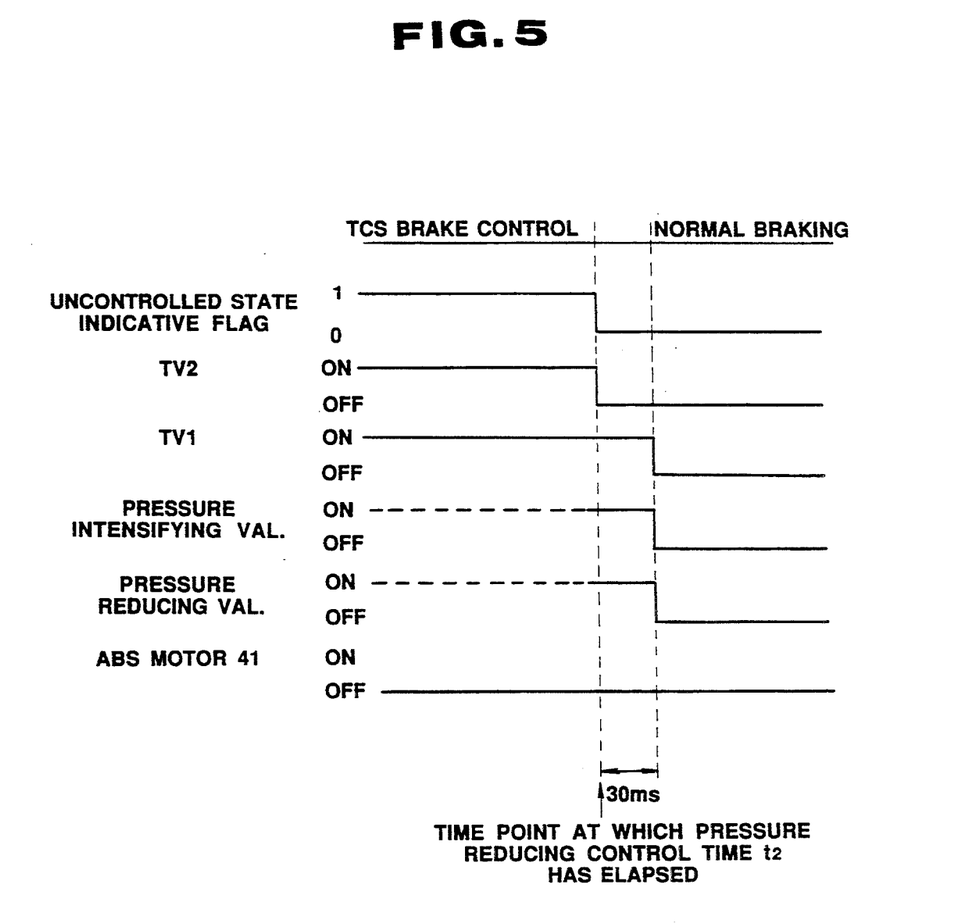
FIG. 5 is a timing chart illustrating the normal braking operation recovery control executed in accordance with the control procedure of the flow chart of FIG. 4.

As clearly shown in FIG. 5, during the TCS brake control wherein an uncontrolled state indicative flag signalling the occurrence of the uncontrolled state being out of the TCS brake control is set at a binary number '1', the first and second switching valves TV1 and TV2 are both held in the ON positions, while the pressure intensifying valves 36c and 36d and the pressure reducing valves 37c and 37d are all held in the ON positions. When the uncontrolled state indicative flag is shifted from the binary number '1' to the binary number '0', i.e., the TCS brake control terminates, the second switching valve TV2 is first shifted from the ON position to the OFF position and thereafter the first switching valve TV1 is shifted from the ON position to the OFF position. In addition, the pressure intensifying valves 36c and 36d and the pressure reducing valves 37c and 37d are all shifted from the ON positions to the OFF positions with the predetermined time lag of 30 msec after termination of the TCS brake control being in the pressure reducing mode. In this case, the motor 41 is held in the OFF state, depending on the acceleration slip state.

As set forth above, during the normal braking operation recovery control without the stop instruction for the acceleration requirement, the malfunction of the system, or the deceleration-slip control requirement, since the first switching valve TV1 is shifted from the ON position to the OFF position with a predetermined time lag, such as 30 msec after shifting of the second switching valve TV2, the traction control system according to the invention can reliably prevent both of the switching valves TV1 and TV2 from momentarily communicating with each other. Therefore, the system of the invention can prevent the master cylinder from being damaged due to a high brake fluid pressure introduced thereinto from the second accumulator unit AU2 through the second switching valve TV2 and the first switching valve TV1, in that order. In contrast to the above, the system of the invention can prevent both of the valves TV1 and TV2 from being shut off momentarily. Therefore, the system of the invention can prevent the brake fluid pressure stored in the hydraulic unit TCS/ABS-HU from escaping into the wheel cylinders 33 and 34. This assuringly prevents undesirable deceleration feeling.

Furthermore, during the normal braking operation recovery control, since the shifting timing of the second switching valve TV2 is set at a particular time point at which the pressure reducing control time $t_2$ has elapsed, the normal braking operation recovers just after termination of the pressure reducing mode of the TCS brake control. That is, the normal braking operation recovers after the brake fluid temporarily stored in the reservoir 38b has returned through the pumping unit 39b to the brake fluid pressure damping chamber 40b, due to the pressure reducing control executed for the above pressure reducing control time $t_2$. Therefore, even through an additional acceleration slip control (TCS brake control) or deceleration slip control (ABS brake control) is performed subsequently to the preceding acceleration slip control, a sufficient amount of brake fluid can be returned from the wheel cylinder via the pressure reducing valve to the reservoir 38b in a procedure reducing mode of the slip control. This prevents the amount of brake fluid to be returned to the reservoir 38b from exceeding the volumetric capacity of reservoir. In addition to the above, it may be easy to determine the pressure reducing control time, because of the smooth reduction of the wheel cylinder pressure in the pressure reducing control. Moreover, since the pressure intensifying valves 36c and 36d and the pressure reducing valves 37c and 37d are all shifted to the OFF positions under a relatively low pressure of the incoming brake fluid, the system insures a long life of each of the valves.

Figure 6:
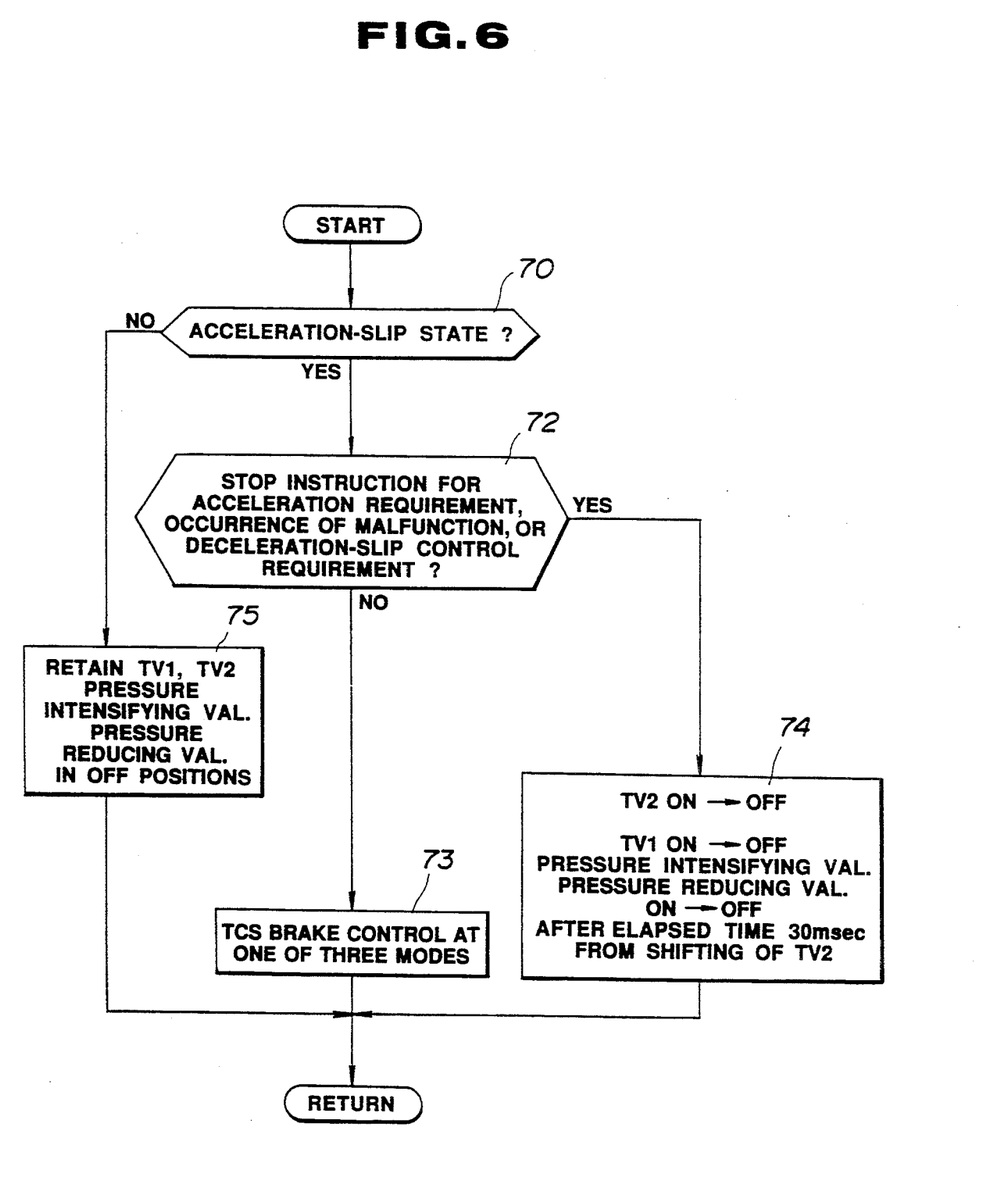
FIG. 6 is another flow chart illustrating another normal braking operation recovery control procedure executed by the traction control system of the embodiment, in case that the normal brake operation recovers when a stop instruction for an acceleration requirement is generated, a malfunction of the traction control system is detected, or a deceleration-slip control requirement is generated, during the acceleration-slip control.

During the normal braking operation recovery control with the stop instruction for the acceleration requirement, the malfunction of the system, or the deceleration-slip control requirement, a control routine is performed in accordance with the flow chart shown in FIG. 6.

Figure 4:
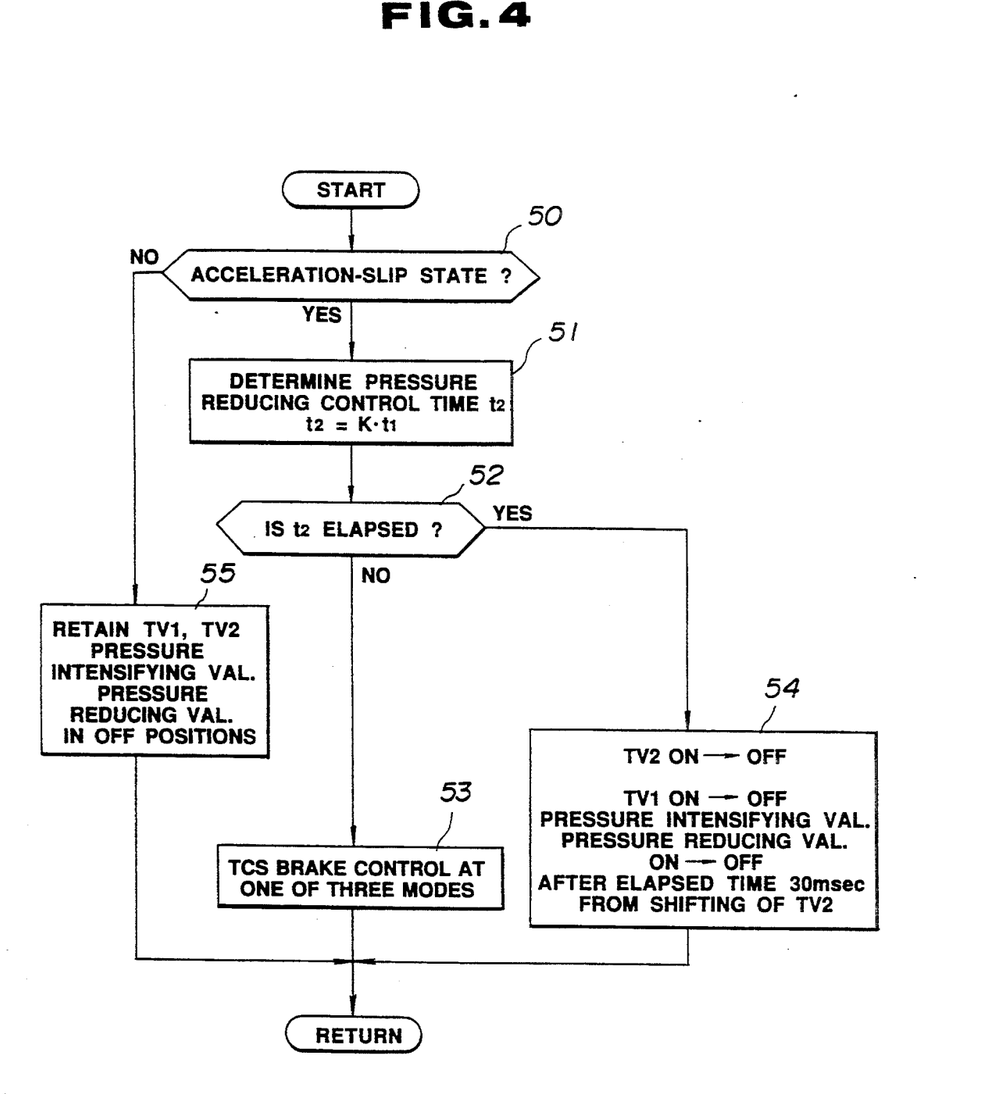
FIG. 4 is a flow chart illustrating a normal braking operation recovery control procedure executed by an electronically control unit applied commonly to the ABS and TCS when the normal braking operation recovers just after the TCS brake control terminates.

The control routine of FIG. 6 is different from that of FIG. 4 in that steps 51 and 52 are replaced with step 72. Since the steps 50, 53, 54 and 55 are equivalent to steps 70, 73, 74 and 75, respectively, only a step 72 is hereinbelow described in detail, for the purpose of simplification of the disclosure.

In step 72, a test is made to determine whether the control unit receives either one of a stop instruction for the acceleration requirement, an abnormal state indicative signal indicative of the malfunction of the system, and a deceleration-slip control requirement. The stop instruction for the acceleration requirement is generated when the accelerator opening angle is less than a predetermined threshold value or when the brake pedal has depressed.

Figure 7:
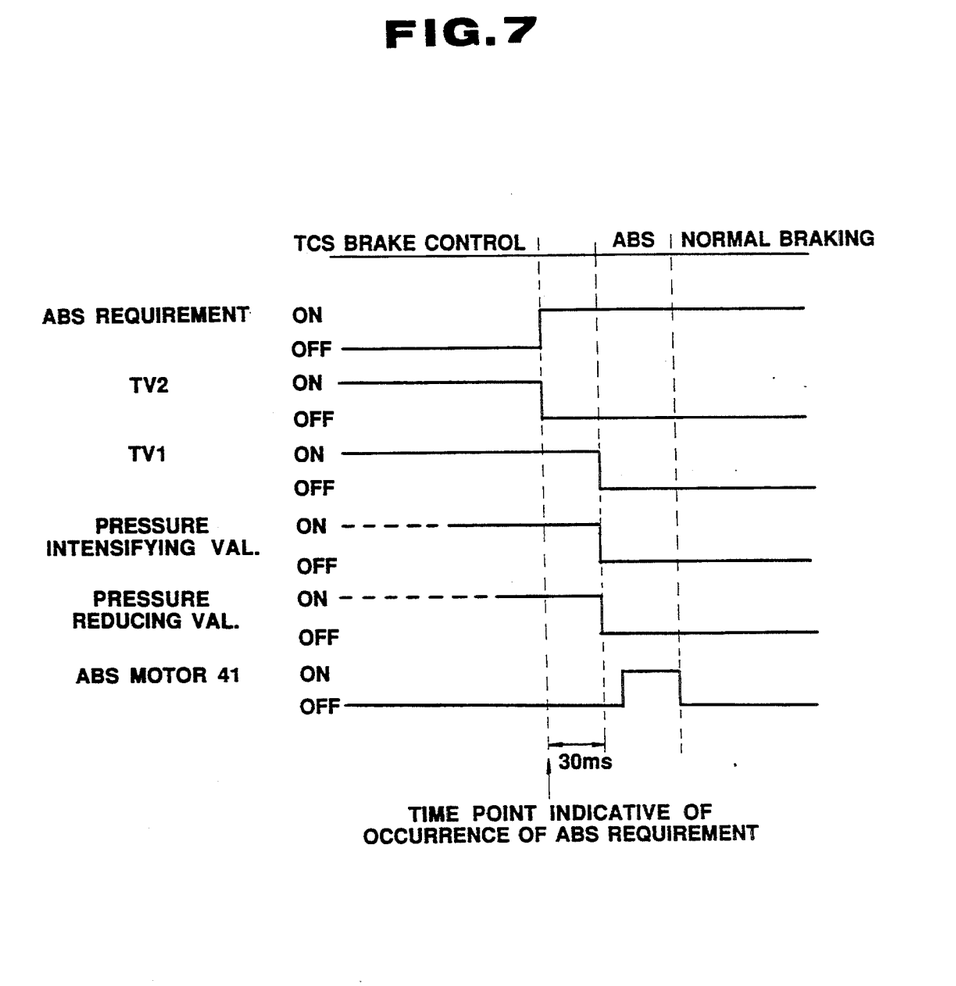
FIG. 7 is a time chart illustrating the normal braking operation recovery control executed in accordance with the control procedure of the flow chart of FIG. 6.

During the previously noted normal braking operation recovery control with either one of the stop instruction for the acceleration requirement, the occurrence of the malfunction of the system, and the deceleration-slip requirement, the TCS brake control system operates in accordance with the timing charts shown in FIG. 7.

As clearly shown in FIG. 7, during the TCS brake control, the first and second switching valves TV1 and TV2 are both maintained in the ON positions, while the pressure intensifying valves 36c and 36d and the pressure reducing valves 37c and 37d are all maintained in the ON positions. As seen in FIG. 7, if the centralized control unit receives the ABS requirement in a transient state wherein the brake control mode is shifted from the TCS brake controlling mode to the normal braking operational mode, the second switching valve TV2 is first shifted from the ON position to the OFF position at a particular time point at which the ABS requirement is generated. After a predetermined period of time, such as 30 msec has elapsed from the particular time point, the first switching valve TV1 is shifted from the ON position to the OFF position. Simultaneously, the pressure intensifying valves 36c and 36d and the pressure reducing valves 37c and 37d are all shifted from the ON positions to the OFF positions with the predetermined time lag of 30 msec after shifting of the second switching valve TV2, i.e., from the particular time point indicative of the occurrence of the ABS requirement. As seen from the timing chart of FIG. 7 indicative of the ON/OFF state of the motor 41, so called ABS motor, the motor 41 is held in the ON state during operation of the ABS.

As will be appreciated from the above, during the normal braking operation recovery control with the stop instruction for the acceleration requirement, the malfunction of the system, or the deceleration-slip requirement, since the first switching valve TV1 is shifted from the ON position to the OFF position with a predetermined time lag, such as 30 msec after shifting of the second switching valve TV2, the traction control system of the invention can reliably prevent the switching valves TV1 and TV2 from momentarily communicating with each other in a transient state from the TCS brake controlling mode to the normal braking operational mode with the ABS requirement (deceleration-slip requirement), the stop instruction for the acceleration requirement, or the malfunction of the system. In addition, the system of the invention can prevent the valves TV1 and TV2 from being shut off momentarily. Therefore, the traction control system of the invention can prevent the master cylinder 30 or the wheel cylinders 33 and 34 from being affected by an undesirable brake fluid pressure. Furthermore, during the normal braking operation recovery control, the 10 shifting timing of the second switching valve TV2 is set at a particular time point at which the control unit receives the deceleration-slip requirement or the stop-instruction for the acceleration requirement or detects the malfunction of the system. As a result, the normal braking operation timely recovers at the particular time point at which either one of the above requirements is generated. In the additional embodiment shown in FIGS. 6 and 7, the control unit controls the first and second switching valves TV1 and TV2, and the pressure intensifying valves 36c and 36d and the pressure reducing valves 37c and 37d, such that the time point where the stop-instruction for the acceleration requirement, the deceleration-slip requirement, or the abnormal signal indicative of malfunction of the system is generated, gets priority over the time point where the pressure reducing control time $t_2$ has elapsed, in a transient normal braking operation recovery state wherein the brake control mode is shifted from the TCS brake control mode to the normal braking operational mode. That is, the control unit operates the valve TV2 in the OFF position upon receiving either one of the above requirements, irrespective of a kind of the TCS brake control modes, namely the pressure intensifying mode, the pressure holding mode, and the pressure reducing mode, and thereafter operates the valves TV1, 36c, 36d, 37c, and 37d in the OFF positions with the predetermined time lag of 30 msec. The time lag can be set at a proper short time, such as 30 msec. Therefore, the traction control system of the invention can provide a high step-response with regard to the previously noted requirements. The system of the invention can effectively prevent an increase in braking distance and retardation of braking time, during deceleration-slip control, even when the deceleration-slip requirement, or the stop instruction for the acceleration requirement is generated, or the malfunction of the system is detected, in a transient state wherein the brake control mode is shifted from-the TCS brake control mode to the normal braking operational mode.

Although the traction control system according to the preferred embodiment is applied to a system executing both the traction throttle control and the traction brake control in combination, the embodiment may be applied to a system executing only a traction brake control.

While the foregoing is a description of the preferred embodiments for carrying out the invention, it will be understood that the invention is not limited to the particular embodiments shown and described herein, but may include variations and modifications without departing from the scope or spirit of this invention as described by the following claims.

What is claimed is:

1. An automotive traction control system comprising:
   a master cylinder for generating a master cylinder pressure based on a movement of a brake pedal;
   at least one wheel cylinder activated by the master cylinder pressure generated by said master cylinder;
   an external brake fluid pressure source for generating a brake fluid pressure, regardless of depression of the brake pedal;
   a brake fluid pressure control actuator being applied commonly to an acceleration-slip control and a deceleration-slip control, for controlling a wheel cylinder pressure in said at least one wheel cylinder;
   a first switching valve for establishing and blocking a fluid communication between said master cylinder and said pressure control actuator;
   a second switching valve for establishing and blocking a fluid communication between said external brake fluid pressure source and said pressure control actuator;
   means for deriving a pressure reducing control time duration necessary to reduce said wheel cylinder pressure to a designated brake fluid pressure, as a function of a previous pressure intensifying control time duration when said pressure control actuator operates at a pressure intensifying mode, during said accelerations-slip control according to which said first switching valve is shifted to a valve closed state to block the communication between said master cylinder and said pressure control actuator and said second switching valve is shifted to a valve open state to establish the communication between said external brake fluid pressure source and said pressure control actuator; and
   a first normal braking operation recovery control means for shifting said second switching valve to a valve closed state just after said pressure reducing control time has elapsed, and for shifting said first switching valve to a valve open state with a predetermined time lag after shifting of said second switching valve to said valve closed state, and for recovering said pressure control actuator to a normal braking operational mode, in a transient state wherein a brake control mode is shifted from the acceleration-slip control mode to the normal braking operational mode at which said wheel cylinder pressure is adjusted depending on the magnitude of said master-cylinder pressure.

2. The automotive traction control system as set forth in claim 1, wherein said brake fluid pressure control actuator includes a plurality of pairs of pressure intensifying valve and pressure reducing valve, each pair being associated with either one of the wheel cylinders, and said pair of pressure intensifying valve and pressure reducing valve is cooperative with each other during said acceleration-slip control in a manner so as to operate at three modes among the pressure intensifying mode wherein the wheel cylinder pressure in the associated wheel cylinder is intensified by the brake fluid pressure introduced thereinto through said external brake fluid pressure source for said pressure intensifying control time, a pressure holding mode wherein the wheel cylinder pressure is held unchanged, and the pressure reducing mode wherein the wheel cylinder pressure is reduced for said pressure reducing control time.

3. The automotive traction control system as set forth in claim 2, wherein said predetermined time lag is set at approximately 30 msec.

4. An automotive traction control system comprising:
a master cylinder for generating a master cylinder pressure based on a movement of a brake pedal;
at least one wheel cylinder activated by the master cylinder pressure generated by said master cylinder;
an external brake fluid pressure source for generating a brake fluid pressure, regardless of depression of the brake pedal;
a brake fluid pressure control actuator being applied commonly to an acceleration-slip control and a deceleration-slip control, for controlling a wheel cylinder pressure in said at least one wheel cylinder;
a first switching valve for establishing and blocking a fluid communication between said master cylinder and said pressure control actuator;
a second switching valve for establishing and blocking a fluid communication between said external brake fluid pressure source and said pressure control actuator;
means for monitoring occurrence of a stop instruction for an acceleration requirement, a malfunction of the system, or a deceleration-slip requirement according to which an anti-skid brake control starts, in a transient state wherein a normal braking operation recovers after termination of said acceleration-slip control according to which said first switching valve is shifted to a valve closed state to block the communication between said master cylinder and said pressure control actuator and said second switching valve is shifted to a valve open state to establish the communication between said external brake fluid pressure source and said pressure control actuator and said second switching valve is shifted to a valve open state to establish the communication between said external brake fluid pressure source and said pressure control actuator; and
a second normal braking operation recovery control means for shifting said second switching valve to a valve closed state substantially at a time of occurrence of said stop instruction for an acceleration requirement, said malfunction of the system, or said deceleration-slip requirement, and for shifting said first switching valve to a valve open state with a predetermined time lag after shifting said second switching valve to said valve closed state, and for recovering said pressure control actuator to a normal braking operational mode, in said transient state.

5. An automotive traction control system comprising:
a master cylinder for generating a master cylinder pressure based on a movement of a brake pedal;
at least one wheel cylinder activated by the master cylinder pressure generated by said master cylinder;
an external brake fluid pressure source for generating brake fluid pressure, regardless of depression of the brake pedal;
a brake fluid pressure control actuator being applied commonly to an acceleration-slip control and a deceleration-slip control, for controlling a wheel cylinder pressure in said at least one wheel cylinder;
a first switching valve for establishing and blocking a fluid communication between said master cylinder and said pressure control actuator;
a second switching valve for establishing and blocking a fluid communication between said external brake fluid pressure source and said pressure control actuator;
means for deriving a pressure reducing control time duration necessary to reduce said wheel cylinder pressure to a designated brake fluid pressure, as a function of a previous pressure intensifying control time duration when said pressure control actuator operates at a pressure intensifying mode, during said acceleration-slip control according to which said first switching valve is shifted to a valve closed state to block the communication between said master cylinder and said pressure control actuator and said second switching valve is shifted to a valve open state to establish the communication between said external brake fluid pressure source and said pressure control actuator;
a first normal braking operation recovery control means for shifting said second switching valve to a valve closed state just after said pressure reducing control time has elapsed, and for shifting said first switching valve to a valve open state with a predetermined time lag after shifting said second switching valve to said valve closed state, and for recovering said pressure control actuator to a normal raking operational mode, in a transient state wherein a brake control mode is shifted from the acceleration-slip control mode to the normal braking operational mode at which said wheel cylinder pressure is adjusted depending on the magnitude of said master-cylinder pressure;
means for monitoring occurrence of a stop instruction for an acceleration requirement, a malfunction of the system, or a deceleration-slip requirement according to which an anti-skid brake control starts, in said transient state; and
a second normal braking operation recovery control means for shifting said second switching valve to the valve closed state substantially at a time of occurrence of said stop instruction for an acceleration requirement, said malfunction of the system, or said deceleration-slip requirement, and for shifting said first switching valve to the valve open state with a predetermined time lag after shifting said second switching valve to said valve closed state, and for recovering said pressure control actuator to the normal braking operational mode, in said transient state;
wherein a command generated by said second normal braking operation recovery control means gets priority over a command generated by said first normal braking operation recover control means.

* * * * *